(12) United States Patent
Soliman

(10) Patent No.: US 10,119,647 B2
(45) Date of Patent: *Nov. 6, 2018

(54) VARIABLE SPEED PIPELINE PIG WITH INTERNAL FLOW CAVITY

(71) Applicant: Saudi Arabian Oil Company, Dhahran (SA)

(72) Inventor: Mohamed Ahmed A. Soliman, Ras Tanura (SA)

(73) Assignee: SAUDI ARABIAN OIL COMPANY (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/629,292

(22) Filed: Jun. 21, 2017

(65) Prior Publication Data

US 2017/0284590 A1 Oct. 5, 2017

Related U.S. Application Data

(63) Continuation of application No. 14/187,467, filed on Feb. 24, 2014, now Pat. No. 9,810,365.

(51) Int. Cl.
*F16L 55/38* (2006.01)
*B08B 9/055* (2006.01)
(Continued)

(52) U.S. Cl.
CPC ............ *F16L 55/38* (2013.01); *B08B 9/0551* (2013.01); *B08B 9/0553* (2013.01); *F16L 2101/12* (2013.01); *F16L 2101/30* (2013.01)

(58) Field of Classification Search
CPC .... F16L 55/38; F16L 2101/12; B08B 9/0553; B08B 9/0551
(Continued)

(56) References Cited

U.S. PATENT DOCUMENTS 2,617,134 A 11/1952 Barton, Jr.
2,785,757 A 3/1957 Middleton
(Continued)

FOREIGN PATENT DOCUMENTS

DE 4111452 A1 10/1992
DE 19632332 A1 3/1997

OTHER PUBLICATIONS

"Advanced By-Pass Pig" Pigtek Ltd, www.pigtek.com/advanced_by-pass_pig.php, 1 pg.
(Continued)

*Primary Examiner* — Michael Jennings
(74) *Attorney, Agent, or Firm* — Bracewell LLP; Constance Gall Rhebergen

(57) ABSTRACT

Embodiments provide a housing defining a trailing end, a leading end and longitudinal axis extending therebetween, at least one relief channel extending longitudinally through the housing between the trailing end and the leading end thereof, the at least one relief channel defining an annular wall, a closure member disposed within the annular wall, the closure member operable to engage a first seat to prohibit fluid flow through the relief channel and operable to disengage the first seat to permit fluid flow through the relief channel, and an annular space defined between the closure member and the annular wall, the annular space exhibiting a smaller cross-section than regions of relief channel upstream and downstream of the closure member such that the annular space represents a constriction for fluid flow and the relief channel defines a venturi.

3 Claims, 6 Drawing Sheets

(51) Int. Cl.
*F16L 101/12* (2006.01)
*F16L 101/30* (2006.01)

(58) Field of Classification Search
USPC .................................... 15/104.061, 104.062
See application file for complete search history.

(56) References Cited

U.S. PATENT DOCUMENTS

| | | |
|---|---|---|
| 2,860,356 A | 11/1958 | Matheny |
| 3,052,302 A | 9/1962 | Lagucki |
| 3,056,156 A | 10/1962 | Immel |
| 3,395,759 A | 8/1968 | Talley, Jr. |
| 3,561,490 A | 2/1971 | Little |
| 3,758,050 A | 9/1973 | Watts et al. |
| 4,069,535 A | 1/1978 | Cato |
| 4,081,875 A | 4/1978 | Nishino |
| 4,498,932 A | 2/1985 | Kruka |
| 4,923,011 A | 5/1990 | Skipper |
| 5,012,866 A | 5/1991 | Skipper |
| 5,265,302 A | 11/1993 | Sivacoe |
| 5,625,917 A | 5/1997 | Hawkins |
| 5,795,402 A | 8/1998 | Hargett, Sr. et al. |
| 5,875,803 A | 3/1999 | Leitko et al. |
| 6,098,231 A | 8/2000 | Smith et al. |
| 6,944,902 B1 | 9/2005 | Richter et al. |
| 7,143,829 B2 | 12/2006 | Booth |
| 7,252,142 B2 | 8/2007 | Brezinski |
| 7,452,161 B2 | 11/2008 | Freyer et al. |
| 7,900,696 B1 | 3/2011 | Nish |
| 8,087,119 B2 | 1/2012 | Mousa |
| 8,286,479 B2 | 10/2012 | Harvey et al. |
| 8,776,899 B2 | 7/2014 | Fripp |
| 9,464,511 B2 | 10/2016 | Fripp |
| 2004/0194809 A1 | 10/2004 | Crawford et al. |
| 2005/0045210 A1 | 3/2005 | Baugh |
| 2010/0000037 A1 | 1/2010 | Pruett et al. |
| 2010/0132737 A1 | 6/2010 | Mousa |
| 2010/0263759 A1 | 10/2010 | Maimets |
| 2010/0314130 A1 | 12/2010 | Durst |
| 2011/0061681 A1 | 3/2011 | Cassidy |
| 2012/0042903 A1 | 2/2012 | Mousa |
| 2015/0240985 A1* | 8/2015 | Soliman .............. B08B 9/0551 134/8 |

OTHER PUBLICATIONS

International Search Report and Written Opinion for International Application No. PCT/US2015/015193; International Filing Date Feb. 10, 2015; Report dated May 18, 2015 (pp. 1-7).

Nguyen et al. "Modeling and Simulation for PIG with Bypass Flow Control in Natural Gas Pipeline" KSME International Journal, vol. 15, No. 9, Sep. 2001, pp. 1302-1310.

\* cited by examiner

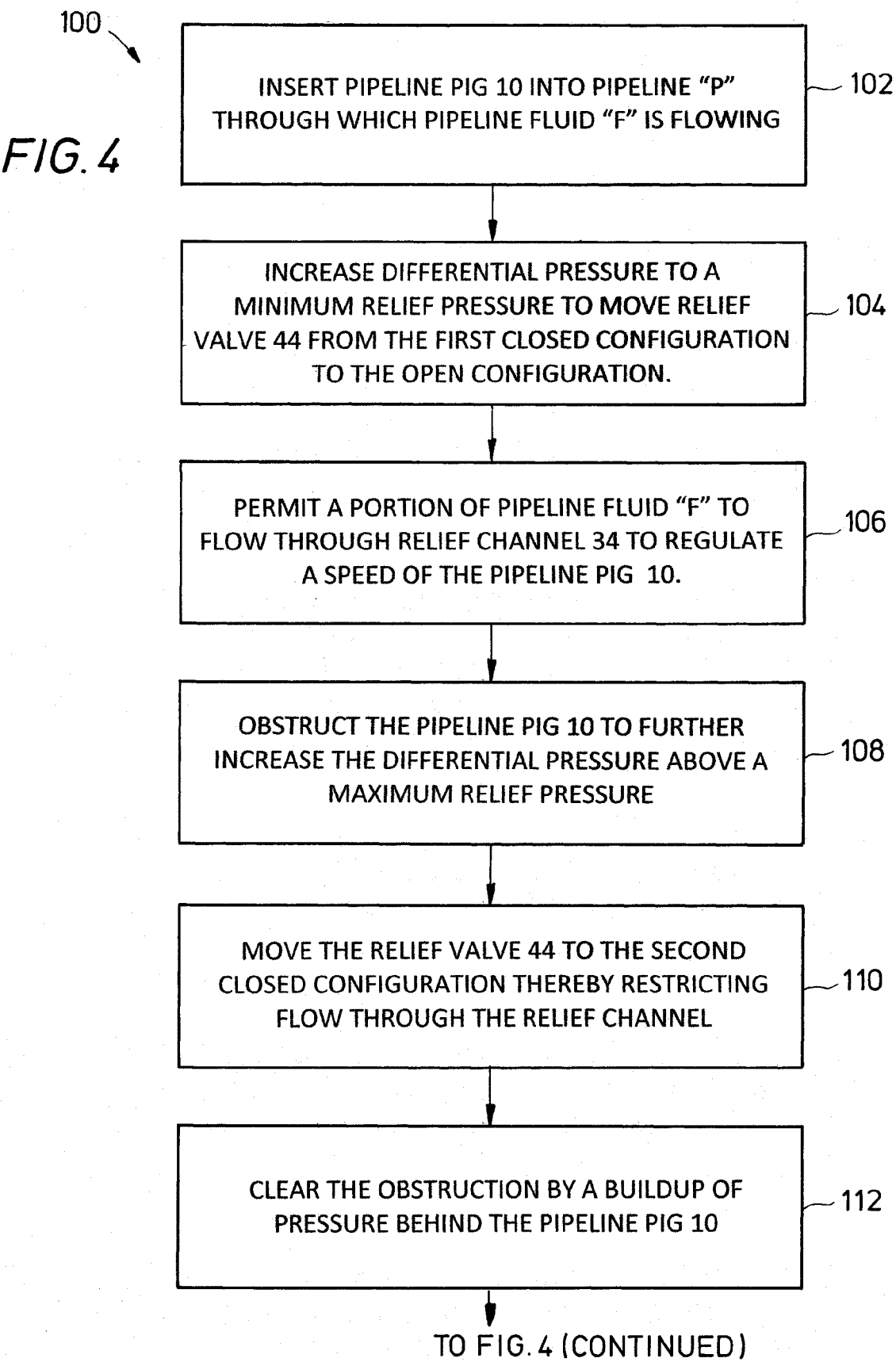

VARIABLE SPEED PIPELINE PIG WITH INTERNAL FLOW CAVITY

CROSS-REFERENCE TO RELATED APPLICATION

This application is a continuation of and claims priority to and the benefit of U.S. patent application Ser. No. 14/187,467 filed on Feb. 24, 2014, entitled "VARIABLE SPEED PIPELINE PIG WITH INTERNAL FLOW CAVITY," which is hereby incorporated by reference in its entirety into this application.

BACKGROUND

Field

Embodiments relate generally to a pipeline pig that is propelled by the pressure of a pipeline fluid flowing through a pipeline. In particular, embodiments relate to a pipeline pig with a plurality of distinct flow channels extending therethrough that selectively permit and prohibit flow of the pipeline fluid through the pipeline pig.

Description of the Related Art

An instrument for inspecting, cleaning, and maintaining a pipeline is often referred to as a pipeline pig. In some applications, the pipeline pig is propelled along an interior of the pipeline under the pressure of a pipeline fluid flowing through the pipeline. To facilitate advancement of the pipeline pig, one or more flexible guide disks or cups are often provided that extend outwardly from a longitudinal body of the pipeline pig. The flexible guide disks extend to an interior wall of the pipeline so as to form a seal between the pipeline and the pipeline pig. If the seal is substantially complete, the pipeline pig is induced to travel at the speed of the pipeline fluid. In some applications, flow channels are provided through the pipeline pig to permit a portion of the pipeline fluid to flow through the pipeline pig, thereby regulating the speed of the pipeline pig.

Buildup of debris within the pipeline can be problematic for the operation of the pipeline pig. Debris ahead of the pig may slow the pipeline pig below a minimum speed required for carrying out the desired application, or in some instances, can completely prevent the pipeline pig from moving forward through the pipeline. Also, flow channels for regulating a speed of the pipeline pig reduce the maximum fluid force that can be applied to the pipeline pig to drive it through the pipeline, and thus can increase the likelihood that the pipeline pig will become stuck in the pipeline when debris or other obstructions are encountered. If the pipeline pig becomes stuck in the pipeline, flow of the pipeline fluid can be restricted or impeded. Often, contingency plans to recover the pipeline pig include cutting the pipeline at the point where the pig is stuck in order to remove it. Once the pig is removed, the pipeline is then reconnected and put back in service. This contingency plan is costly due to inhibited pipeline flow and downtime while the pipeline is cleared.

SUMMARY

Described herein are systems and methods for controlling a flow of pipeline fluid through a pipeline pig. Embodiments of the systems and methods include relief channels that can be selectively opened and closed to regulate both the speed of the pipeline pig and the fluid force available behind the pipeline pig for clearing obstructions ahead of the pipeline pig. Flow of the pipeline fluid can be diverted from the relief channels to a central bypass channel to permit continued production through the pipeline in the event the force required to clear an obstruction is unsafe for the pipeline pig or the pipeline.

According to at least one embodiment, there is provided a housing defining a trailing end, a leading end and longitudinal axis extending therebetween, at least one relief channel extending longitudinally through the housing between the trailing end and the leading end thereof, the at least one relief channel defining an annular wall, a closure member disposed within the annular wall, the closure member operable to engage a first seat to prohibit fluid flow through the relief channel and operable to disengage the first seat to permit fluid flow through the relief channel, and an annular space defined between the closure member and the annular wall, the annular space exhibiting a smaller cross-section than regions of relief channel upstream and downstream of the closure member such that the annular space represents a constriction for fluid flow and the relief channel defines a venturi.

According to at least one embodiment, the closure member is further operable to engage a second seat to prohibit fluid flow through the relief channel while the closure member is disengaged from the first seat.

According to at least one embodiment, the pipeline pig further includes an automated controller arranged within the housing, wherein the automated controller is configured to control, independent of an external control by a user, one or more actuators in response to an internal sensor of the pipeline pig.

BRIEF DESCRIPTION OF THE DRAWINGS

So that the manner in which the above-recited features, aspects and advantages of the invention, as well as others that will become apparent, are attained and can be understood in detail, a more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

DETAILED DESCRIPTION

Embodiments will now be described more fully hereinafter with reference to the accompanying drawings. The invention may, however, be embodied in many different forms and should not be construed as limited to the illustrated embodiments set forth herein. Rather, these embodiments are provided so that this disclosure will be thorough and complete, and will fully convey the scope of the invention to those skilled in the art.

Figure 1A:
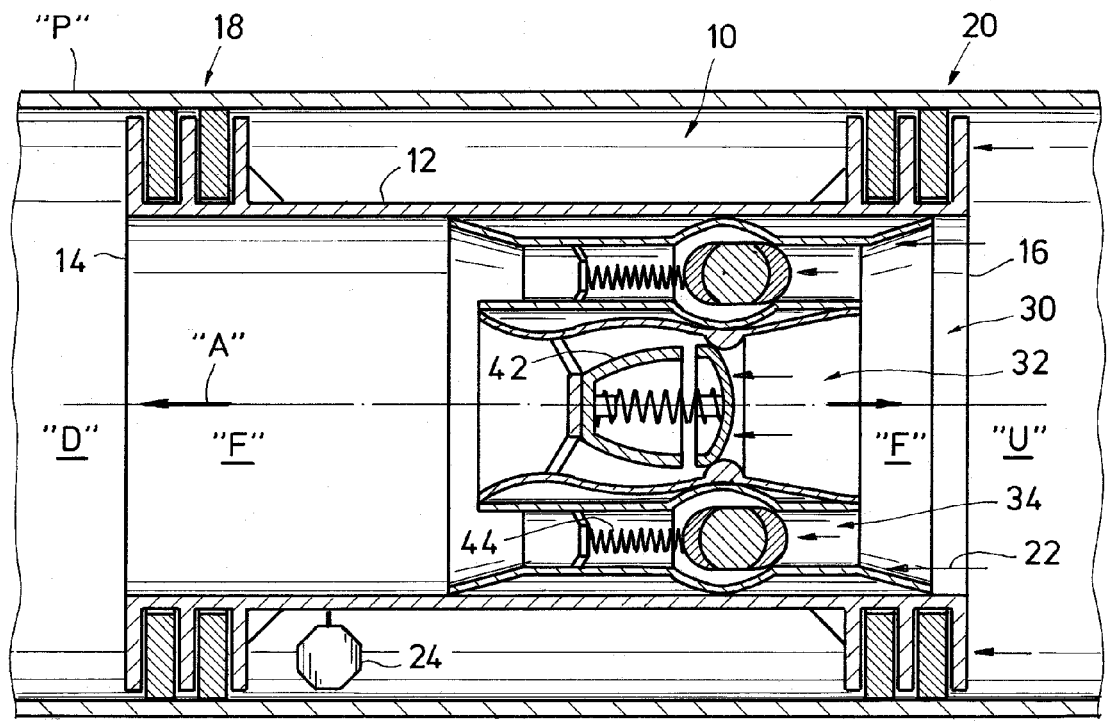
FIG. 1A is a schematic cross-sectional side view of a pipeline pig including a passive bypass valve and a plurality of passive relief valves in accordance with an example embodiment.
Figure 1B:
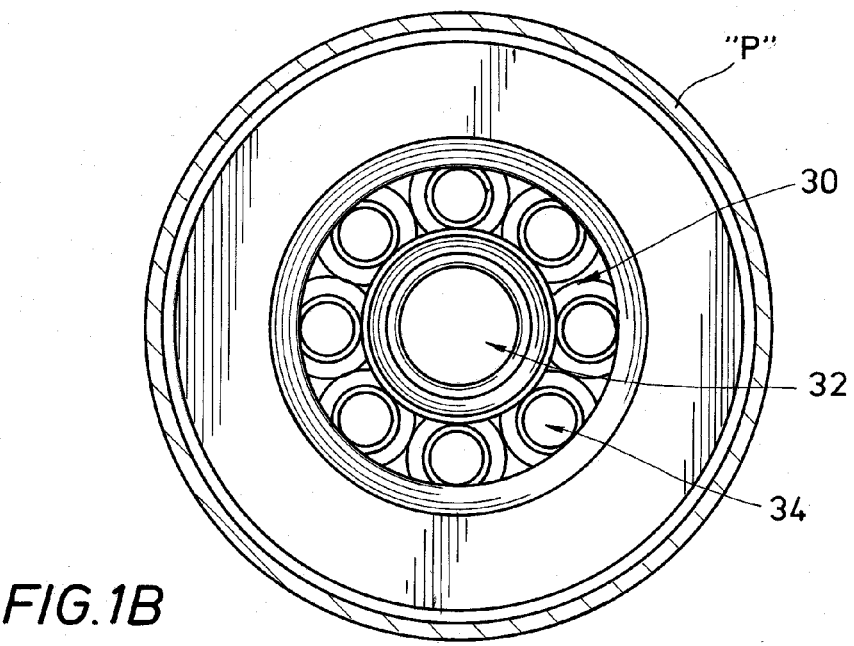
FIG. 1B is an end view of the pipeline pig of FIG. 1A.

Referring to FIGS. 1A and 1B, pipeline pig 10 is constructed in accordance with an example embodiment, and is disposed within an interior of pipeline "P." Pipeline pig 10 includes housing 12, which defines a downstream or leading end 14, an upstream or trailing end 16 and longitudinal axis "A" extending therebetween. A pressure differential established in pipeline fluid "F" between leading end 14 and trailing end 16 propels pipeline pig 10 through the interior of pipeline "P." As used herein, unless otherwise specified, the phrase "differential pressure" designates a relatively high pressure on an upstream side (generally designated in the figures by "U" (toward trailing end 16)) of pipeline pig 10 with respect to a relatively low pressure on a downstream side (generally designated in the figures by "D" (toward leading end 14)). A plurality of bracketed front guide discs 18, and bracketed rear guide discs 20 are disposed about housing 12 at leading end 14 and trailing end 16 respectively. Bracketed front guide discs 18 and bracketed rear guide disks 20 sealingly contact a wall of pipeline "P" to scrape deposits therefrom and to guide pipeline pig 10 through pipeline "P." Pipeline pig 10 is propelled as pipeline fluid "F," as indicated by arrows 22, push pipeline pig 10. In some embodiments, pinger 24 is included within or mounted to housing 12 of pipeline pig 10. Pinger 24 is operable to provide a signal to facilitate determination of a location of pipeline pig 10 throughout deployment of pipeline pig 10 in pipeline "P."

Internal flow cavity 30 extends longitudinally through pipeline pig 10 between trailing end 16 and leading end 14 of housing 12. Internal flow cavity 30 includes bypass channel 32 extending centrally therethrough and a plurality of distinct relief channels 34 radially disposed about bypass channel 32. In the embodiment illustrated, eight (8) relief channels 34 are provided although more or fewer are provided in other embodiments. Bypass valve 42 is provided within bypass channel 32. As described in greater detail below, bypass valve 42 is operable to selectively restrict and permit flow of pipeline fluid "F" through bypass channel 32. Relief valves 44 are provided within each relief channel 34. Relief valves 44 are operable to selectively restrict and permit flow of pipeline fluid "F through respective relief channels 34. In the embodiment illustrated, bypass valve 42 and relief valves 44 are longitudinally adjacent although, in other embodiments, bypass valve 42 is disposed in an upstream position or in a downstream position with respect to relief valves 44.

Figure 2A:
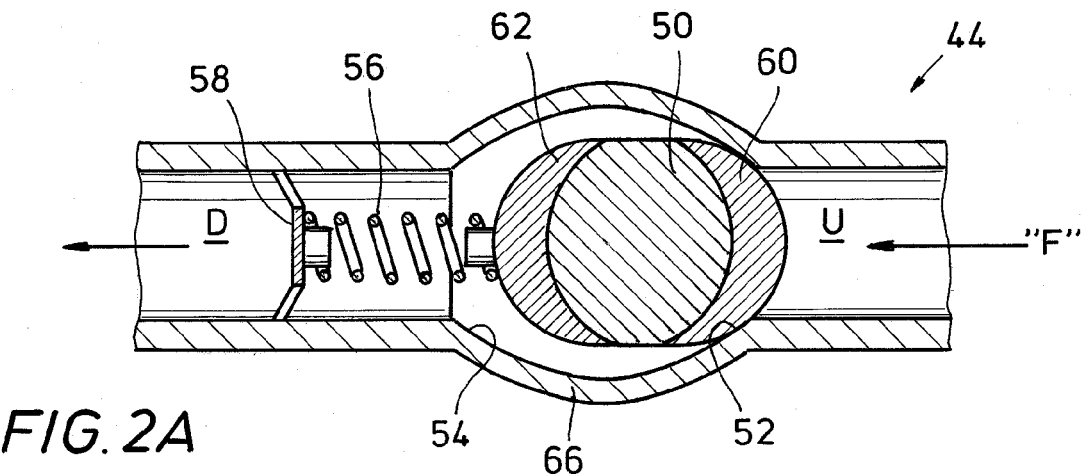
FIGS. 2A through 2C are schematic side views of one of the relief valves of FIG. 1A arranged respectively in a first closed configuration, an open configuration and a second closed configuration, illustrating an example sequence of operation in accordance with an example embodiment.
Figure 2B:
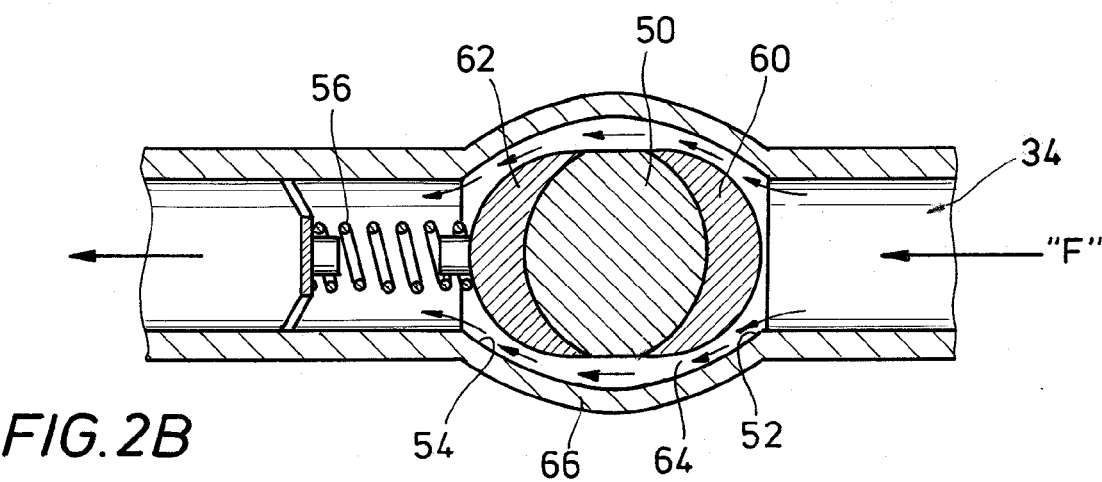
Figure 2C:
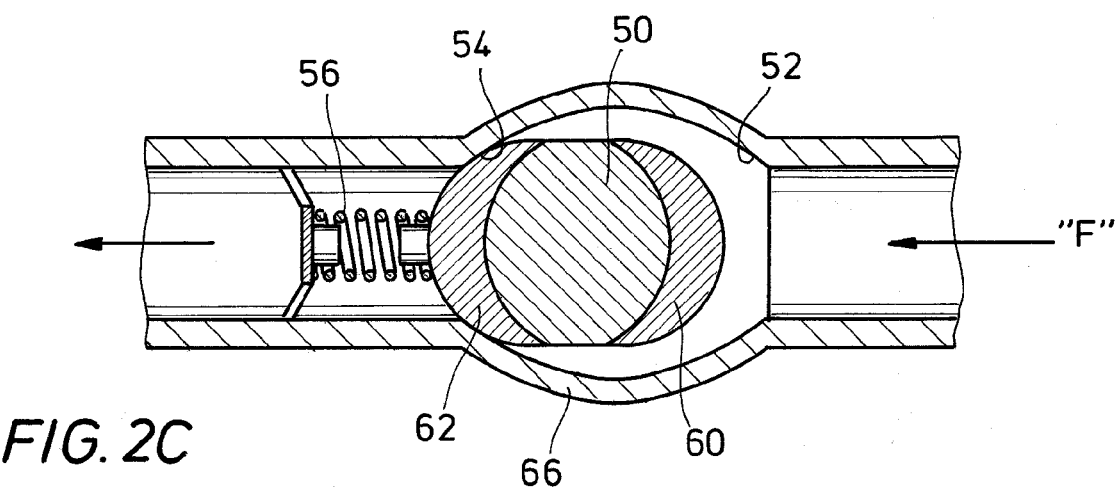

Referring now to FIGS. 2A through 2C relief valve 44 is selectively movable between at least three distinct configurations including a first closed configuration (FIG. 2A), an open configuration (FIG. 2B) and a second closed configuration (FIG. 2C). Relief valve 44 includes closure member 50 that is respectively movable between first seat 52 and second seat 54 to move relief valve 44 between the first and second closed configurations. Closure member 50 is biased toward first seat 52 and away from second seat 54 by biasing member 56. In the illustrated embodiment, biasing member 56 is a compression spring coupled between closure member 50 and support plate 58, and is disposed in a downstream position with respect to closure member 50. Thus, biasing member 56 provides a force to the closure member 50 in a direction opposite a direction of a flow of pipeline fluid "F" as indicated by arrow 22.

As illustrated in FIG. 2A, when a differential pressure between upstream and downstream sides of closure member 50 is maintained below a pre-selected minimum relief pressure, the force of biasing member 56 is sufficient to maintain closure member 50 in sealing contact with first seat 52. Upstream end 60 engages first seat 52 in the first closed configuration to form a metal-to-metal seal therewith. In some embodiments, upstream end 60 is constructed of a relatively soft material such as a brass or tin alloy to establish a fluid-tight seal with relatively hard first seat 52, which is constructed of steel. In other embodiments, other materials including elastomers or other non-metallic materials such as polyetheretherketone (PEEK) polymers are provided in at least one of upstream end 60 or first seat 52 to facilitate formation of a fluid-tight seal.

When the differential pressure between upstream and downstream sides of closure member 50 reaches the pre-selected minimum relief pressure, relief valve 44 moves from the first closed configuration of FIG. 2A to the open configuration of FIG. 2B. The pre-selected minimum relief pressure is the pressure necessary for the pipeline fluid "F" pressing upon an upstream end 60 of closure member 50 to overcome the biasing force of biasing member 50 that maintains upstream end 60 in sealing contact with first seat 52. In some embodiments, the pre-selected minimum relief pressure associated with each of relief valve 44 is equivalent, and is in the range of 1 psi to 3 psi. In other embodiments, each relief valve 44 is associated with an incremental pre-selected minimum relief pressure such that relief valves 44 moves to the open configuration sequentially as the differential pressure increases. In some embodiments, each pair of radially opposite relief valves 44 is associated with the same pre-selected minimum relief pressure such that opposing relief valves 44 move to the open configuration simultaneously to balance the flow of production fluid "F" through internal flow cavity 30 (FIG. 1A).

As illustrated in FIG. 2B, upstream end 60 and downstream end 62 of closure member 50 each exhibit a hemispherical or bulbous profile, which guides pipeline fluid "F" into and out of an annular space 64 surrounding closure member 50. Annular space 64 is defined by annular wall 66 of bypass channel 34 with an increasing inner diameter from first seat 52 and second seat 54 toward a longitudinally central region of annular space 64. Annular space 64 exhibits smaller cross-sectional area than regions of relief channel 34 upstream and downstream of closure member 50, and thus, annular space 64 represents a constriction for fluid flow. A venturi is defined by this constriction in the flow of pipeline fluid "F," as will be appreciated by those skilled in the art. The shape of annular space 64 compliments the shape of upstream end 60 and downstream end 62 to discourage turbulence in the flow of pipeline fluid "F" through relief channel 34 and thereby manage erosion of annular wall 66, closure member 50 and other surfaces as appreciated by those skilled in the art. Flow of pipeline fluid "F" through relief channel 34 serves to limit the speed of pipeline pig 10 (FIG. 1A) through pipeline "P."

When the differential pressure in pipeline fluid "F" between upstream and downstream sides of closure member 50 reaches a pre-selected maximum relief pressure, relief valve 44 moves from the open configuration of FIG. 2B to the second closed configuration of FIG. 2C. In some embodiments, the pre-selected maximum relief pressure associated with relief valve 44 is in the range of 4 psi to 6 psi, as is often realized when pipeline pig 10 encounters an obstruction or debris in pipeline "P" (FIG. 1A). Downstream end 62 engages second seat 54 in the second closed configuration to form a seal therewith. As one skilled in the art will appreciate, in some embodiments, downstream end 62 and second seat 52 are constructed of any of the materials described above for the construction of upstream end 60 or first seat 52 to facilitate formation of a fluid-tight seal.

In the event that the differential pressure is reduced to below the pre-selected maximum relief pressure, as is often realized when an obstruction is cleared from pipeline "P" (FIG. 1A) downstream of pipeline pig 10, biasing member 56 urges closure member 50 away from second seat 54. For example, if the differential pressure is reduced to a level between the pre-selected minimum relief pressure and the pre-selected maximum relief pressure, biasing member 56 returns relief valve 44 to the open configuration of FIG. 2B, and if the differential pressure is reduced to a level below the pre-selected minimum relief pressure, biasing member 56 returns relief valve 44 to the first closed configuration of FIG. 2A. As one skilled in the art will appreciate, attributes of biasing member 56 such as a spring constant, length and pre-load, which are incorporated into the design of relief valve 44, define the pre-selected minimum relief pressure and the pre-selected maximum relief pressure. In this manner, relief valve 44 is operable in a repeatable manner.

Figure 3A:
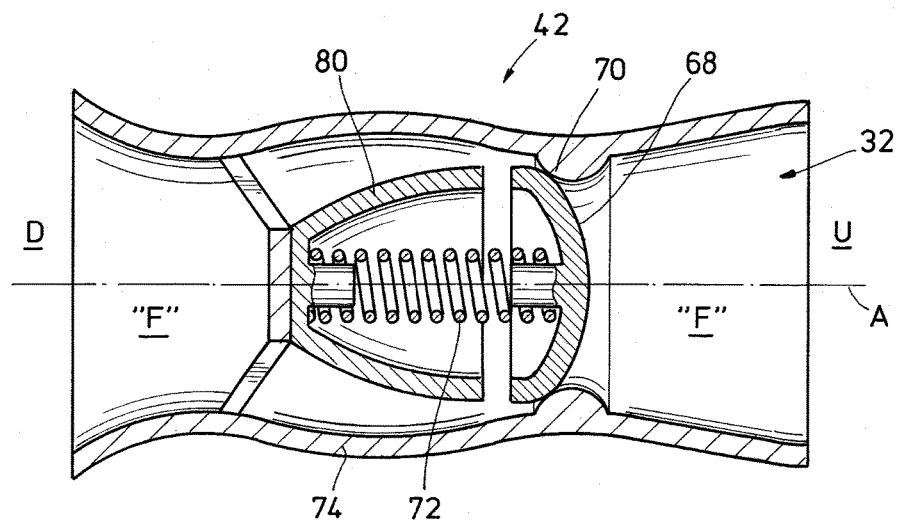
FIGS. 3A and 3B are schematic side views of the bypass valve of FIG. 1A arranged respectively in a restrictive configuration and bypass configuration.
Figure 3B:
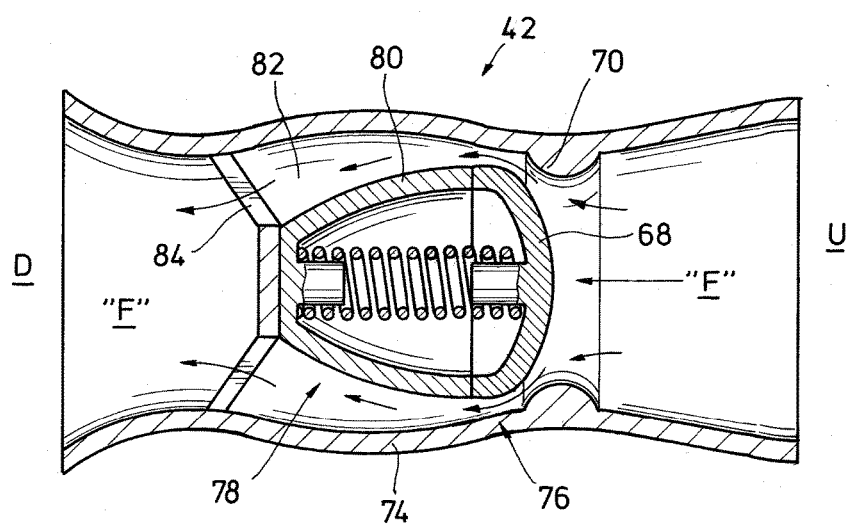

Referring now to FIGS. 3A and 3B, bypass valve 42 is selectively movable between at least two distinct configurations including a restrictive configuration (FIG. 3A) and bypass configuration (FIG. 3B). In the restrictive configuration, bypass valve 42 is closed and completely prohibits pipeline fluid "F" from flowing through bypass channel 32 in some embodiments. In the bypass configuration, bypass valve 42 is at least partially open and permits pipeline fluid "F" to flow through bypass channel 32. Bypass valve 42 includes bypass closure member 68 that is respectively movable into and out of contact with bypass seat 70 to move bypass valve 42 between the restrictive and bypass configurations. Bypass closure member 68 is biased in an upstream direction toward bypass seat 70 by biasing member 72. In the illustrated embodiment, biasing member 72 is a compression spring disposed centrally within bypass channel 32 along longitudinal axis "A" to maintain bypass valve 42 in the restrictive configuration until the differential pressure reaches a pre-selected minimum bypass pressure. The pre-selected minimum bypass pressure is defined by attributes of biasing member 72 such as a spring constant, length and pre-load incorporated into the design of bypass valve 42.

Biasing member 72 is configured such that bypass valve 42 is operable to maintain the restrictive configuration when the differential pressure in pipeline fluid "F is below the pre-selected minimum bypass pressure, operable to maintain the bypass configuration the differential pressure is above the pre-selected minimum bypass pressure, and operable to move between the restrictive configuration and the bypass configuration in response to the differential pressure reaching the pre-selected minimum bypass pressure.

When the differential pressure between upstream and downstream sides of bypass closure member 68 reaches a pre-selected minimum bypass pressure, a force applied by biasing member 72 to maintain bypass closure member 68 in contact with bypass seat 70 is overcome and bypass valve 42 opens. As the differential pressure increases beyond the pre-selected minimum bypass pressure, biasing member 72 is compressed in a proportional manner, thereby allowing bypass closure member 68 to move away from bypass seat 70 in a proportional manner. Thus, biasing member 72 is responsive to the differential pressure to adjust a size of tapering constriction 76 through which pipeline fluid "F" flows. In this manner, bypass valve 42 passively moves from the restrictive configuration of FIG. 3A, wherein flow of pipeline fluid "F" through bypass channel 32 is restricted, to the bypass configuration of FIG. 3B wherein the flow of pipeline fluid "F" through bypass channel 32 is permitted. In some embodiments, the pre-selected minimum bypass pressure associated with bypass valve 42 is greater than 90 psi, and in some embodiments the pre-selected minimum bypass pressure is 100 psi. The pre-selected minimum bypass pressure is significantly greater than the pre-selected maximum relief pressure described above such that bypass valve 42 moves to the bypass configuration of FIG. 3B when each relief valve 44 is in the second closed configuration of FIG. 2C.

In the bypass configuration of FIG. 2C, bypass channel 32 and bypass valve 42 are arranged to promote flow of pipeline fluid "F" through bypass channel 32. Bypass channel 32 includes outer wall 74, which defines tapering constriction 76 with bypass closure member 68. Tapering constriction 76 exhibits a smaller cross-sectional area than regions of bypass channel 32 upstream and downstream of bypass closure member 68, and thus, bypass channel 32 defines a venturi to promote fluid flow therethrough. Bypass valve 42 includes valve housing 78 defining inner wall 80 of bypass channel 32. Inner wall 80 extends in a downstream direction from tapering constriction 76. Bypass closure member 68 is arranged to contact inner wall 80 to form a radially decreasing profile therewith when bypass valve 42 is in the bypass configuration. The shape of the bypass closure member 68 and inner wall 80 compliments the shape of outer wall 74 to guide pipeline fluid "F" into annular cavity 82, thereby discouraging turbulence and erosion of bypass channel 32. Radial fins 84 extend between outer wall 74 and housing 78 of bypass valve 42 to support bypass valve 42 within bypass channel 32 and permit flow of pipeline fluid "F" around radial fins 84.

Figure 4:
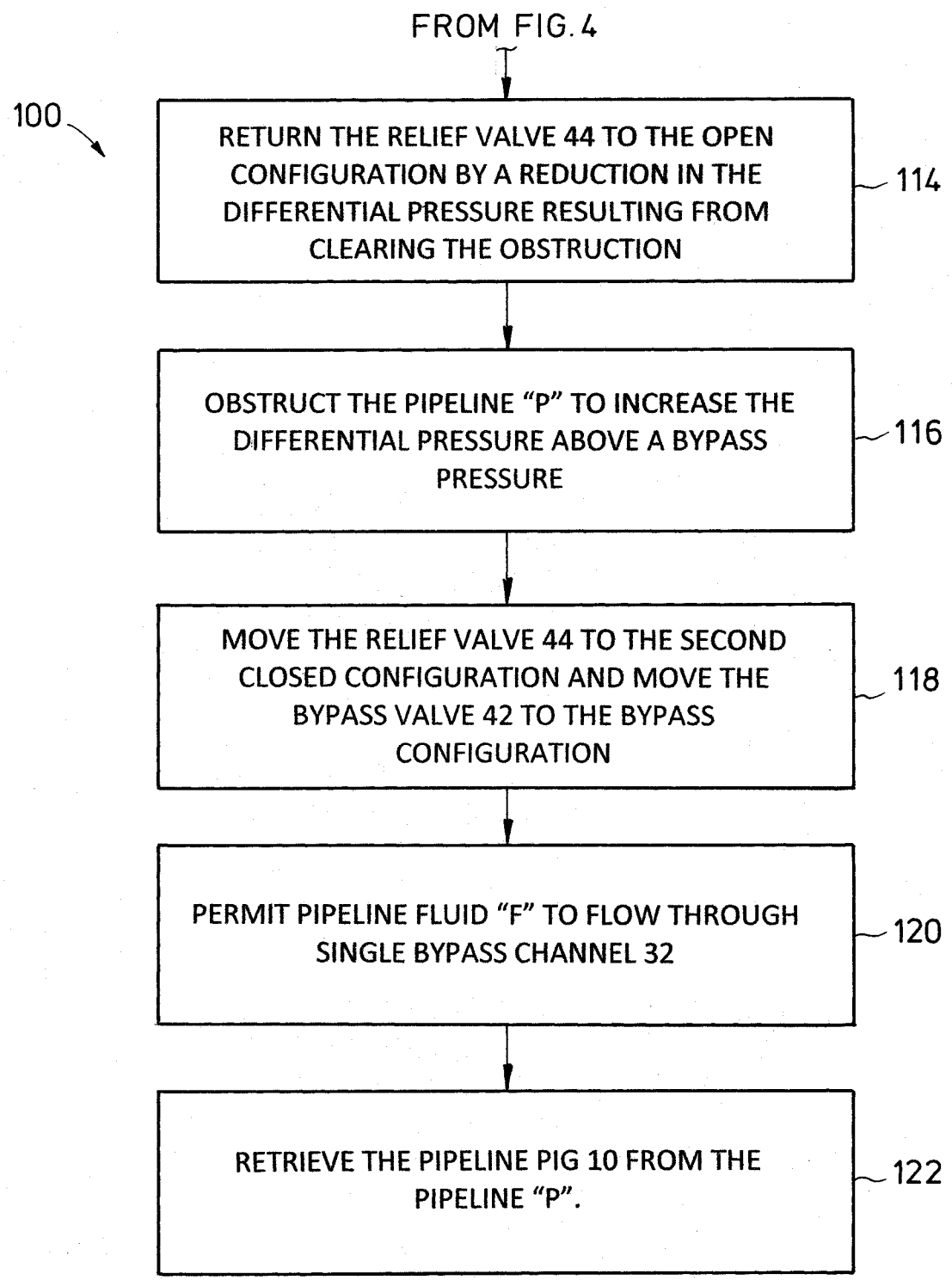
FIG. 4 is a flow diagram illustrating a method of controlling a flow of pipeline fluid through a pipeline pig in accordance with an example embodiment.

Referring now to FIG. 4, an embodiment of a method 100 is described for use of pipeline pig 10 (FIG. 1A). Initially, pipeline pig 10 is inserted into pipeline "P" (step 102) through which pipeline fluid "F" is flowing. Initially, a differential pressure established in pipeline fluid "F" between trailing end 16 and a leading end 14 is below the pre-selected minimum relief pressure. Thus, relief valves 44 are in the first closed configuration and bypass valve 42 is in the restrictive configuration. Pipeline pig 10 is propelled in a downstream direction by the force of pipeline fluid "F" pressing on rear guide disks 20, closure members 50 of relief valves 44, and bypass closure member 68 of bypass valve 42.

Next, the differential pressure is increased to the pre-selected minimum relief pressure (step 104) thereby passively opening relief valves 44. The differential pressure is increased by various mechanisms including increasing a flow velocity of pipeline fluid "F" behind pipeline pig 10. In some embodiments, the differential pressure is increased by at least partially obstructing the pipeline pig and allowing pressure to build up behind the pipeline pig as will be appreciated by those skilled in the art. A portion of pipeline fluid "F" is permitted to flow through relief channel 34 (step 106) to slow or regulate a speed of pipeline pig 10. Relief valves 44 are operable to passively move between the first closed configuration and the open configuration to selectively allow pipeline fluid "F" to flow through relief channels 34 to regulate the speed of pipeline pig 10 in normal operation.

When pipeline pig 10 encounters an obstruction (step 108) however, the differential pressure builds up as the capacity of relief channels 34 is overwhelmed and pipeline fluid "F" accumulates behind pipeline pig 10. The differential pressure increases to above the pre-selected maximum relief pressure, and relief valves 44 are thereby moved to the second closed configuration (step 110). With the relief valves 44 in the second closed configuration, the full force of the buildup of pipeline fluid "F" behind pipeline pig 10 is available to push pipeline pig 10 against the obstruction until the obstruction is dislodged or cleared by pipeline pig 10 (step 112). Once the obstruction is cleared, relief valve 44 returns to the open configuration (step 114), and normal operation resumes.

When pipeline pig 10 encounters an obstruction that cannot be cleared by a force that is safe for pipeline pig 10 or pipeline "P" (step 116) the accumulation of pipeline fluid "F" behind pipeline pig 10 moves relief valves 44 to the second closed configuration and the differential pressure increases to above the pre-selected minimum bypass pressure increases to move bypass valve 42 to the bypass configuration (step 118). Pipeline fluid "F" is permitted to flow through the single bypass channel 32 (step 120) since flow through relief channels 34 are interrupted by relief valves 44. Turbulence and erosion are limited since bypass channel 32 is larger and centrally oriented than relief channels 34. Pinger 24 is employable to locate pipeline pig 10, and pipeline pig 10 is retrieved from pipeline "P."

Figure 5:
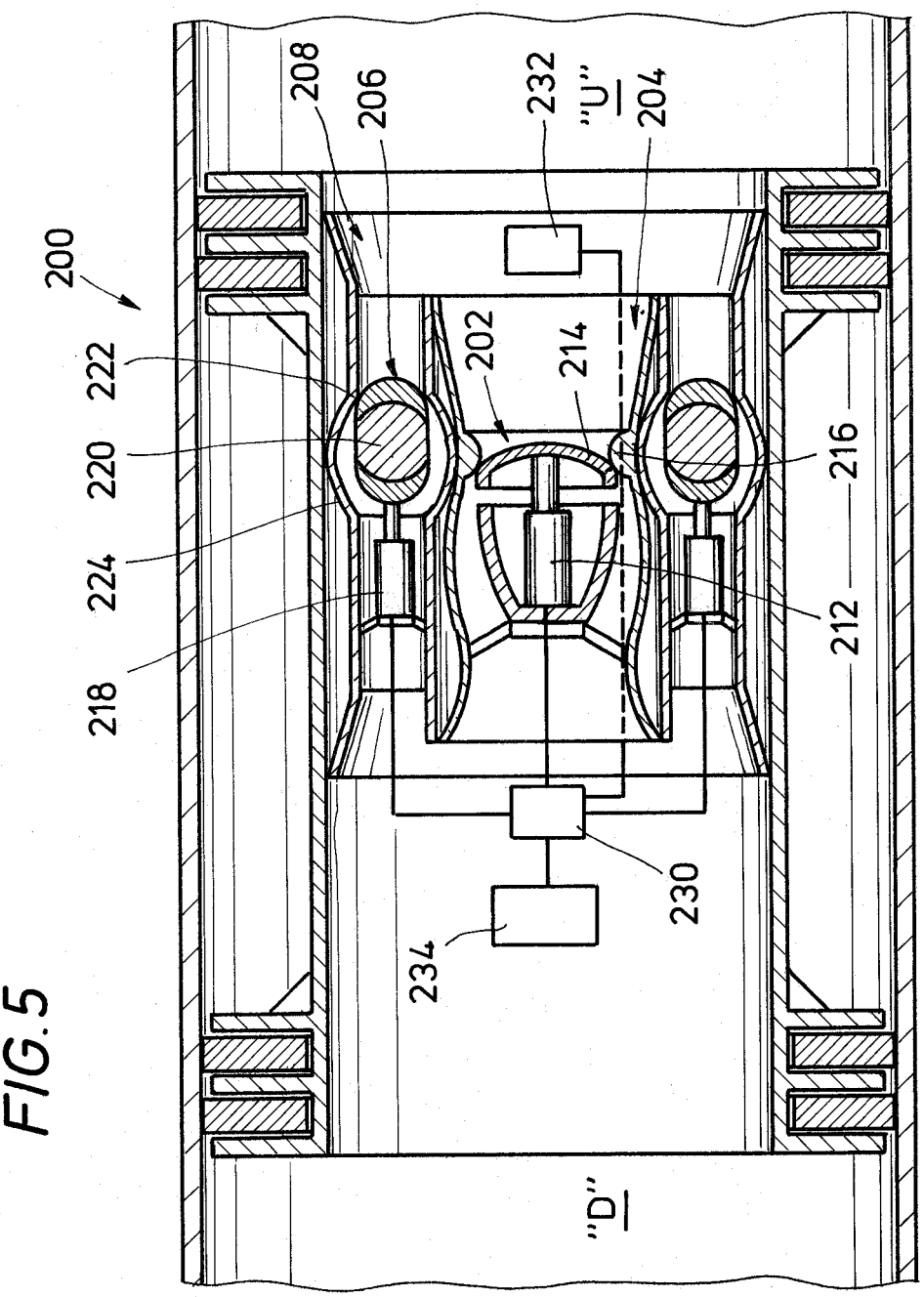
FIG. 5 is a schematic cross-sectional side view of an a pipeline pig including active relief and bypass valves accordance with an alternate example embodiment.

Referring now to FIG. 5, pipeline pig 200 is constructed in accordance with an alternate example embodiment of the invention. Pipeline pig 200 is configured for active control over bypass valve 202 disposed within bypass channel 204 and over relief valves 206 disposed within relief channels 208. Bypass valve 202 includes actuator 212 operable to move closure member 214 into and out of engagement with bypass seat 216 to move bypass valve 202 between restrictive and bypass configurations as described above. Similarly, relief valve 206 includes actuator 218 operable to move closure member 220 into and out of engagement with first seat 222 and second seat 224 to move relief valve 206 between a first closed configuration, an open configuration and a second closed configuration as described above. In the illustrated embodiment, actuators 212, 218 are hydraulic cylinders, although in other embodiments, pneumatic or electric actuators are contemplated.

Actuators 212, 218 are in communication with controller 230, which is operable to induce movement of actuators 212, 218 and to maintain positions of actuators 212, 218. Controller 230 is in communication with pressure sensors 232 and 234, which are respectively disposed on upstream "U" and downstream "D" sides of bypass valve 202 and relief valve 206. Thus, controller 230 is operable to instruct actuator 218 to move closure member 220 into engagement with first seat 222 if a differential pressure detected by pressure sensors 232, 234 is less than the pre-selected minimum relief pressure. Also, controller 230 is operable instruct actuator 218 to move closure member 220 into engagement with second seat 224 if the differential pressure detected is greater than the pre-selected maximum relief pressure, and operable to instruct actuator 218 to move closure member 220 to an intermediate position between first seat 222 and second seat 224 if the differential pressure is between the minimum and pre-selected maximum relief pressures. Similarly, controller 230 is operable to instruct actuator 212 to move closure member 214 into engagement with bypass seat 216 if the differential pressure detected is less than the pre-selected minimum bypass pressure and operable to instruct actuator 218 to move closure member 214 out of engagement with bypass seat 216 if the differential pressure is greater than the pre-selected minimum bypass pressure.

In some embodiments, controller 230 is in wired or wireless communication with an operator terminal (not shown) to permit an operator to provide instructions to actuators 212, 218 independently of pressure sensors 232, 234.

Embodiments described herein, therefore, is well adapted to carry out the objects and attain the ends and advantages mentioned, as well as others inherent therein. While various embodiments have been given for purposes of disclosure, numerous changes exist in the details of procedures for accomplishing the desired results. These and other similar modifications will readily suggest themselves to those skilled in the art, and are intended to be encompassed within the spirit of the various embodiments disclosed herein and the scope of the appended claims.

What is claimed is:

1. A pipeline pig, comprising:
   a housing defining a trailing end, a leading end and longitudinal axis extending therebetween;
   at least one relief channel extending longitudinally through the housing between the trailing end and the leading end thereof, the at least one relief channel defining an annular wall;
   a closure member disposed within the annular wall of each relief channel, the closure member configured to move longitudinally through the relief channel and operable to move toward the trailing end to engage a first seat to prohibit fluid flow through the relief channel and operable to move toward the leading end to disengage the first seat to permit fluid flow through the relief channel; and
   an annular space defined between the closure member and the annular wall, the annular space exhibiting a smaller cross-section than regions of relief channel upstream and downstream of the closure member such that the annular space represents a constriction for fluid flow and the relief channel defines a venturi.

2. The pipeline pig according to claim 1, wherein the closure member is further operable to engage a second seat to prohibit fluid flow through the relief channel while the closure member is disengaged from the first seat.

3. The pipeline pig according to claim 1, further comprising:
   an automated controller arranged within the housing, wherein the automated controller is configured to control, independent of an external control by a user, one or more actuators in response to an internal sensor of the pipeline pig.

* * * * *